3,578,577
SURFACER TREATING PROCESS FOR BLEMISHED ELECTROCOAT SUBSTRATES
Allan E. Gilchrist, Westlake, Ohio, assignor to
SCM Corporation, Cleveland, Ohio
No Drawing. Filed Oct. 11, 1967, Ser. No. 674,639
Int. Cl. B01k 5/02; C23b 13/00
U.S. Cl. 204—181                              5 Claims

ABSTRACT OF THE DISCLOSURE

This patent application sets forth a process for surface treating an electrode substrate used in electrocoating, specifically, one which has surface imperfections or blemishes, and a surfacer composition therefor. The surfacer composition is a curable mixture comprising binder resin and sufficent electrically conductive filler mixed therewith for at most insignificantly changing, in cured thin final section on a blemished surface region of said substrate, the electrical resistance of said region relative to that of the untreated adjacent substrate to be coated. In accordance with the process surfacer composition is applied in thin layer to the blemished region of the substrate, cured (and when appropriate further and finally finished as by wet sanding), then the thus-treated substrate is electrocoated with paint.

---

Reference is made in this patent application to electrocoating, that is the art of coating an electrically conductive substrate by the electrically induced deposition from an aqueous bath thereupon of a coating material comprising one or more organic components, particularly such coating material which contains a resinous polyelectrolyte capable in aqueous dispersion of carrying an electric current. Typical electrocoating processes, apparatus, and compositions are shown in: various U.S. Pats. 2,342,543; 3,230,162; 3,290,235; 3,297,557; South African Pat. 635,534 of December 1963; and several U.S. patent applications in which applications, I am named as an inventor, including pending applications. Ser. Nos. 518,620, 518,667, 638,627 and 662,866. The disclosures of such patents and applications are incorporated herein by reference as illustrative.

The status of the four above-mentioned patent applications is as follows: Ser. No. 518,620 and Ser. No. 662,866 are pending in the U.S. Patent Office; Ser. No. 518,667 issued as U.S. Pat. 3,362,899 on Jan. 9, 1968; and Ser. No. 638,627 has been abandoned in favor of a continuation-in-part application, namely, Ser. No. 814,852 of Apr. 9, 1969.

Frequently, the electrode substrate, generally a metal, has pits, scratches, pores, tool, sanding or filing marks, roughness, smut deposits (e.g. some adherent soil or smudge which tends to come off it at all principally during electrocoating and float to the top of the paint film) or other undesirable surface imperfections and irregularities which are collectively referred to herein as "blemishes." The ordinary electrocoated paint-like deposited coating is of relatively uniform film thickness and does not tend to flow a great deal during cure. Hence, blemishes are not usually well filled with coating material, obliterated, or otherwise rendered innocuous.

My process for improving this situation comprises depositing on at least a portion of the blemished region a thin curable layer of electrically conductive filler in a mixture comprising a binder therefor, the proportion of said filler being sufficient for yielding a cured final deposit area having electrical conductivity approximating that said substrate, curing the layer, and electrocoating said substrate with a paint film.

The surfacer composition that I prefer for this purpose comprises a curable mixture of binder resin and a proportion of electrically conductive filler dispersed therein sufficient for not significantly changing when in cured thin final layer on the blemished region, the electrical resistance of the resulting coated region relative to that of adjacent untreated substrate.

As used herein, an electrocoat substrate is a piece to be electrocoated in the form of an electrode, either anode or cathode, with a film of electrodeposited coating composition which for convenience, I will term a "paint." The "paint film" to be deposited by electrocoating can simply be a resinous binder without pigment or filler; alternatively, it can include finely-divided pigment or filler substances, tints or dyes, particulate resinous material, organic solvents, and other conventional surface coating ingredients such as film plasticizers, non-ionic resins and latices, particulate metals, foam control agents, and the like.

Suitably, the surfacer composition is applied on the electrocoat substrate by any conventional means, for example, by knifing, brushing, or rolling. For efficiency and economy, I prefer to make the surfacer composition paste-like, and to spread it over the blemish with a knife. The lower the shrinkage of the paste upon curing, the better the paste is for control of thickness and evenness. The use of a high proportion of particulate solid filler tends to suppress layer shrinkage as does a low proportion of fugitive solvent relative to total nonvolatile matter in the paste.

The surfacer composition is cured (to a dryness sufficient to resist substantial removal by the subsequent electrocoating operation, and preferably to a tack-free state for handling) in any conventional way, for example, by forced drying at high temperature in an oven, air drying, high energy radiation curing, and/or catalytic thermosetting. Forced drying in an atmospheric oven is preferred and the surfacer composition compounded so that on such curing the layer is hard and smoothable by abrasion, such as by wet sanding. In this way deposits of the surfacer can be feathered out at the edges as well as smoothed. In such instance, the solid phase materials present in the cured deposit best are quite fine, generally below about 44 microns in effective particle diameter. Thus, while the thin cured layer need not be further worked on and can be considered as a final deposit, it is generally preferred to feather it smooth by wet sanding or the like. If the deposit is soft and damp, e.g. uncured or substantially undercured so as to lack resistance to the aqueous bath, the subsequent electrocoating of the paint film can lift some or all of the surfacer right off the substrate.

The most common substrates for application of my process are metal substrates. By this, I mean to include a bare metal such as carbon steel sheet, phosphate treated steel, aluminum, anodized aluminum, tinplate and the like. For intercoat adhesion between the surfacer layer and the electrocoated paint film I believe it best to use as at least a substantial part of the binder in the surfacer composition the same resinous material as used as a substantial part of the binder in the subsequent electrically deposited paint film.

Suitably, electrically conductive films for my purpose include electrically conductive carbon particles such as graphite, selected carbon blacks, and various metal powders and flakes. The binder for them can be virtually any common resinous material or resin-providing material which is curable to a tack-free film that resists dissolution or lifting by the subsequent electrodeposited paint film after curing, preferably those that cure to yield a hard, sandable layer. Preferred binders for rapid forced curing at a temperature of 250–450° F. to a hard, especially resistant condition include thermosetting resins (usually dispersed in a volatile, fugitive organic solvent such as an aromatic hydrocarbon, an alkoxy alkanol, a ketone, an ester or the like, although resins dissolved in copolymerizing reactive solvents, or aqueous dispersions, solutions or latices of resins also can be used). Alternatively, the resin can be thermoplastic if desired. Preferred resins include acrylic resins, alkyd resins, thermosetting unsaturated polyesters dissolved in a vinyl monomer or vinyl oligomer, maleinized drying oils or semi-drying oils (advantageously reacted with a small percentage of vinyl monomer), epoxy-resins, phenolics, aminoplasts, and mixtures of same. Other useful binders include hydrocarbon resins, vinyl and vinylidene homopolymer and copolymer latices, polyethylene resins, butadiene-styrene latices, shellac and other natural resins, polyvinylacetate, vinyl and acrylic polymers generally, all suitably dissolved or dispersed or plasticized for thin layer application where necessary or desirable.

The proportion of electrically conductive filler to binder is made primarily to yield a cured final deposit area (over the blemish) having electrical conductivity approximating that of the surrounding untreated substrate. If the conductivity of the cured surfacer composition is substantially below that of the surrounding untreated substrate and the surfacer soft and uncured, the subsequent electrocoating operation will tend to penetrate and lift the surfacer composition and deposit beneath it similarly to the action noted in U.S. Pat. 3,290,235. If such high resistance surfacer is cured hard, very little if any paint will electrocoat onto it and thus there results very uneven paint coverage.

The presence of resin binder in general substantially reduces the electrical conductivity of the surfacer composition after it is cured. Hence, sufficient conductive filler is compounded with the resin so that cured final deposit area of surfacer over the blemish adds not substantially more than about 5 ohms per square centimeter electrical resistance above the electrical resistance of the adjacent untreated substrate under operating conditions, advantageously more than 1.5 ohms per square centimeter, and preferably not more than 0.5 ohm per square centimeter, the latter matching approximately the resistance added to steel by a conventional phosphate treatment depositing zinc and iron phosphates. Because the cured and finished thickness of the surfacer composition affects overall electrical resistance, the best surfacer composition in a cured and finished thickness not substantially greater than about 2 mils have electrical resistance not substantially above about 5 ohms per square centimeter, more preferably not substantially above about 1.5, and most preferably not substantially above about 0.5 ohm per square centimeter.

The weight ratio of binder to electrical conductive filler can be adjusted within broad limits with or without added ingredients to approximate the electrical conductivity of the substrate. As little as about one weight part of resin per 10 weight parts of conductive filler can in some cases be adequate to hold the filler in place (although more resin usually makes for a better job of surfacing). These ratios are reckoned on the composition of the cured coating. At the other end of the range, it is unlikely that weight ratios above about 9 parts of resin per part of electrically conductive filler are particularly good because the electrical resistance that they add in a cured final thickness of about 1.5–2 mils tends to exceed about 5 ohms per square centimeter of such coated area. However, if surface patches substantially thinner than 1.5 mils are used, such elevated ratios of binder to electrically conductive filler can be used with care. Typically, I have found that a weight ratio of about 1.5–3.5 parts of a thermosetting resin per weight part of graphite or other carbon having good electrical conductivity gives excellent results, and I prefer such composition. In order to get thickening of a surfacer such as a paste without substantially changing the conductivity, I, of course, can use non-conducting or weakly conducting fillers or pigments along with the electrical conductive fillers.

The following examples show ways in which the invention can be practiced, but should not be construed as limiting it. Unless otherwise specified, all parts are weight parts, all percentages weight percentages and all temperatures degrees Fahrenheit.

EXAMPLE 1

A thermosetting acrylic resin dissolved in a mixture of toluene and 2-ethoxy ethanol-1 to give a solution 60% nonvolatile matter (NVM), weight per gallon of 8.82 pounds, and a flash point (C.O.C.) of 101° is compounded with fine artificial graphite powder to yield a binder resin to graphite ratio of 1.64, this ratio being effectively the ratio of binder to pigment in the final cured coating.

This surfacer composition is applied by knifing it on a test electrode to yield a coating of 2 mils (dry thickness). The test electrode is a thin, clean, cold rolled steel sheet. The composition is then cured for 5 minutes at 350°, then wet sanded to approximately 1.6 mils to finish it very smoothly and neatly.

The test cell for determining electrical resistance is a metal tank wired as a cathode, the broadest side walls of which are substantially parallel with and 2.54 cm. out from the surfaces of the test panel wired as an anode. The immersed area of the thin plate anode is 20 square centimeters. A conventional electrocoating bath composition is contained in the tank. Increase in electrical resistance from using the surfacer is measured by determining the difference between total ohmic resistance of the cell using the anode thus coated with cured and sanded surfacer composition and the total electrical resistance of the same cell when the same kind of anode is used, except that it is uncoated with any surfacer, then relating it to unit area of the anode.

Electrical resistance in the cell and, therefore, electrical resistance attributed to the cured surfacing composition amount to 0.15 ohm per square centimeter. When such surfacer-treated electrode is electrocoated using a conventional electrocoating bath dispersion of about 8% solids such as the one shown in Example 1 of U.S. Pat. 3,230,162 maintained at 80° and 100 volts for one minute with a direct current power supply, the anode electrocoats very well. In a further run, a deep scratch on the anode is patched over with the surfacer along its length and for a very short distance on either side, then cured and wet sanded to smooth and feather the patch, and finally similarly electrocoated. The blemish is totally obliterated and the final cured electrocoated part after its oven curing looks ostensibly unblemished by any electrode surface imperfection.

EXAMPLE 2

A chromated thermosetting acrylic-vinyl resin made of butyl acrylate, methacrylic acid, and styrene substantially as shown in Example 5 of U.S. patent application Ser. No. 638,627 is used as a resin binder in the same binder to graphite ratio as the resin in Example 1. In tests conducted identically to those of Example 1, resistance of the surfacer made this way is 0.25 ohm per square centimeter. The product is suitable for coating blemishes, and is especially appropriate for obliterating blemishes when the subsequent electrocoating paint film is compounded with the same kind of acrylic binder resin.

EXAMPLE 3

A series of electrical resistance tests are run in the manner of Example 1 except that the surfacer composition binder is a mixture of 42% resin solids from Example 2 and 58% resin solids from Example 1, and the proportion of binder to graphite filler is varied over a wide range to check this variable against ohmic resistance added per square centimeter of immersed test electrode. At a binder solids (NVM) to graphite weight ratio of 1.64, the ohms per square centimeter increase is 0.2; at 3.2, the ohms per square centimeter increase is 0.4; at 6.56, the increase is 1.2; at 8.7, the increase is 4.8; at 10.9, the increase is 63; and at 13.1, the increase is 113. This test indicates that the binder resin to graphite weight ratio is best maintained below about 9:1, suitably about 3:1 to approximate a conventional zinc-iron phosphate treatment, and even lower to approach conductivity of a bare steel surface.

EXAMPLE 4

A gray filler paste is made using 300 parts of the resin dispersion of Example 2 and 400 parts of the resin dispersion of Example 1, 50 parts of n-butanol, 125 parts of graphite, and 125 parts of rutile titania pigment. The weight ratio of binder is 1.6:1. The resin dispersion of Example 1 is a commercial solution called "Bakelite Acrylic Resin 150," a product of Union Carbide Company, the properties of which solution were hereinbefore described. It is applied using a knife or pad over blemishes on cold rolled sheet steel anodes preparatory to their electrocoating, cured by drying at 3–5 minutes at 350°, and smoothed and feathered at the edges by wet sanding. The thus treated parts are conventionally electrocoated as anodes. Uniformity of paint film thickness is ostensibly good, being at least about 85% as thick as that on the adjacent, untreated areas, and the obliteration of blemishes in these electrocoat substrates is, to the naked eye, virtually complete.

I claim:
1. A process for surface treating an electrocoat substrate having a blemished surface region which comprises depositing on at least a portion of said blemished region a thin curable layer of electrically conductive filler in a mixture containing binder therefor, the proportion of said filler being sufficient for yielding a cured final deposit area having electrical conductivity approximating that of said substrate, curing said layer, and electrocoating said substrate with a paint film.

2. The process of claim 1 wherein said layer is subjected to smoothing treatment after the curing step.

3. The process of claim 1 wherein said layer has insignificant shrinkage upon curing.

4. The process of claim 1 wherein at least part of said binder and a resin component of the paint film for said electrocoating are alike.

5. The process of claim 1 wherein said substrate is metal, and the cured final deposit area has not substantially more than about 5 ohms per square centimeter greater electrical resistance than the untreated substrate.

References Cited

UNITED STATES PATENTS

| | | | |
|---|---|---|---|
| 3,408,278 | 10/1968 | Stoodley | 204—181 |
| 3,467,588 | 9/1969 | Gebler et al. | 204—181 |

HOWARD S. WILLIAMS, Primary Examiner

U.S. Cl. X.R.

252—511, 512; 260—40